United States Patent [19]

Alves et al.

[11] Patent Number: 5,048,112

[45] Date of Patent: Sep. 10, 1991

[54] DATA DECOMPRESSION SYSTEM AND METHOD

[75] Inventors: James F. Alves, Calabasas; Jerry A. Burman, Westlake Village, both of Calif.

[73] Assignee: Hughes Aircraft Company, Los Angeles, Calif.

[21] Appl. No.: 514,779

[22] Filed: Apr. 25, 1990

[51] Int. Cl.$^5$ .............................................. G06K 9/36
[52] U.S. Cl. ..................................... 382/56; 358/432; 358/433
[58] Field of Search .................. 382/56; 358/432, 433

[56] References Cited

U.S. PATENT DOCUMENTS 3,980,809  9/1976  Cook .................................. 358/433
4,758,979  7/1988  Chiao-Yoeh ......................... 382/56

Primary Examiner—Leo H. Boudreau
Assistant Examiner—David Fox
Attorney, Agent, or Firm—C. D. Brown; R. M. Heald; W. K. Denson-Low

[57] ABSTRACT

Data decompression of an image is implemented by reconstructing blocks of pixels from a table that stores orthogonal icons and related attributes representing a data compressed image. Each block of pixels is processed independently of all other blocks. Orthogonal processing is employed to reconstruct orthogonal features that relate to manufactured elements in an image. An optimum set of orthogonal icons and an optimum set of attributes for each icon are employed to further improve data decompression and fidelity. The optimal set of orthogonal icons includes a flat icon, an edge icon, a ribbon icon, a corner icon and a spot icon. The optimal set of attributes includes average intensities, intensity transition position and separation, and angle of the principal axis.

23 Claims, 4 Drawing Sheets

DATA DECOMPRESSION SYSTEM AND METHOD

CROSS REFERENCE TO RELATED APPLICATIONS

Reference is made to a related patent application entitled "Improved Data Compression System and Method," Ser. No. 07/514,778, filed on Apr. 25, 1990 which is incorporated herein by reference.

BACKGROUND

The present invention relates generally to data decompression, and in particular, to data decompression for images.

Conventional image data compression and decompression are used in various systems, including database memory systems to reduce memory storage requirements and in data communications systems to reduce communication bandwidth requirements. For such systems to provide high image fidelity, the data compression is correspondingly low.

In conventional database memory systems, an image is data compressed and the data compressed image is stored by a database memory. When the image is to be displayed, the data compressed image is accessed from the database memory and is decompressed for display.

In conventional communication systems, an image is data compressed, and the data compressed image is communicated to a remote location. At the remote location, the data compressed image is stored in a database memory in compressed form. When the image is to be displayed at the remote location, the data compressed image is accessed from the database memory and is decompressed for display.

SUMMARY OF THE INVENTION

The present invention is an improvement in data decompression for images, using relatively simple processing to restore an image and to provide improved data compression relative to the fidelity achieved. The present invention is particularly appropriate for decompression of an image that has been data compressed in accordance with the teachings of the patent application entitled "Improved Data Compression System and Method". It reverses the data compression operations taught therein by reconstructing blocks of pixels from orthogonal icons and the related attributes. It is particularly effective in reconstructing orthogonal features, occurring in the original image. These advantages are achieved by reconstructing a plurality of relatively small independent blocks of pixels into which the image was partitioned by the data compression processing. Each block of pixels is reconstructed by converting edge locations, dimensions, and intensities that are implicit in the stored icon and the attributes for that block of pixels into areas of constant intensity separated by intensity transitions or edges.

Orthogonal decompression, implemented by reconstructing small blocks of pixels along principal axes of intensity edges, reconstructs orthogonal features with good fidelity. The use of an optimum set of orthogonal icons and an optimum set of attributes for each icon further improves data decompression and fidelity.

A preferred embodiment of a data compression system comprises an input memory employed to store a data compressed image having a plurality of icons. A decompression processor coupled to the input memory and is adapted to generate a data decompressed image in response to the plurality of icons thereof. A display monitor is coupled to the decompression processor for displaying the data decompressed image.

Accordingly, a feature of the present invention is to provide an improved data decompression system and method. Another feature of the present invention is the synthesis of a block of pixels from an orthogonal icon and related attributes. Another feature of the present invention is a set of orthogonal icons and related attributes that is particularly suitable for reconstructing orthogonal features of images. Another feature of the present invention is the processing of each block of pixels independent of each other block of pixels. Another feature of the present invention is the parallel processing of multiple blocks of pixels.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4, comprising

DETAILED DESCRIPTION

Figure 1A:
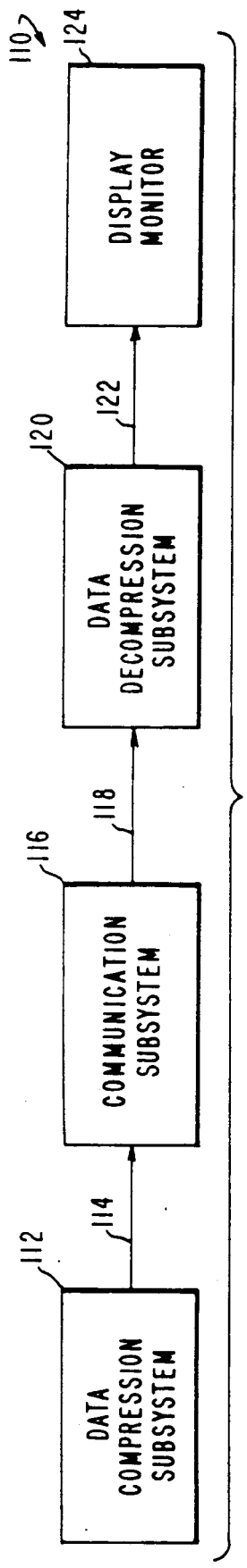
FIG. 1A is a block diagram representation of a communication system using data decompression in accordance with the principles of the present invention.

A communication system 110 in accordance with the principles of the present invention is shown in FIG. 1A. A data compression subsystem 112 is coupled to a communication subsystem 116 to communicate a data compressed image to a remote location. At the remote location, the communication subsystem 116 is coupled to a data decompression subsystem 120 which in turn is coupled to a display monitor 124. The data compression subsystem 112 data compresses an image in accordance with the orthogonal compression arrangement and method described in the patent application, referenced in the Cross reference to Related Applications section hereof. The data compressed image is shown generated as a data compressed image signal 114 and is communicated to the remote location by the communication subsystem 116 as a communication signal 118. At the remote location, the communication signal 118 is decompressed by the data decompression subsystem 120, which generates a decompressed image signal 122 and which is displayed by the display monitor 124.

Figure 1B:
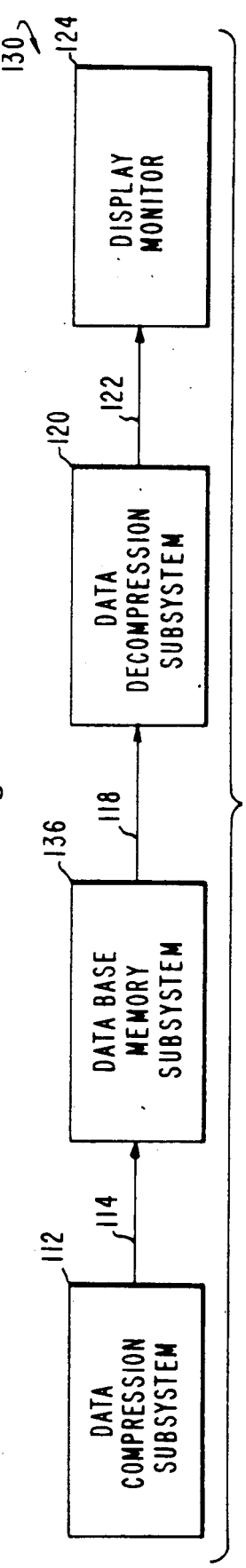
FIG. 1B is a block diagram representation of a database memory system using data decompression in accordance with the principles of the present invention.

A database memory system 130 in accordance with the principles of the present invention is shown in FIG. 1B. A data compression subsystem 112 is coupled to a database memory subsystem 136, which in turn is coupled a data decompression subsystem 120, and which in turn is coupled to a display monitor 124 in accordance with the present invention. The data compression subsystem 112 data compresses an image in accordance with the orthogonal compression arrangement and method described in the cross referenced patent application. The data compressed image is stored as a table of orthogonal icons and related attributes by the database memory subsystem 136. The image is displayed by accessing the data compressed image from the database memory 136 as signal 118 that is input to the data decompression subsystem 120, which generates a decompressed image signal 122. The display monitor 124 then displays the decompressed image in response to the decompressed image signal 122.

Figure 1C:
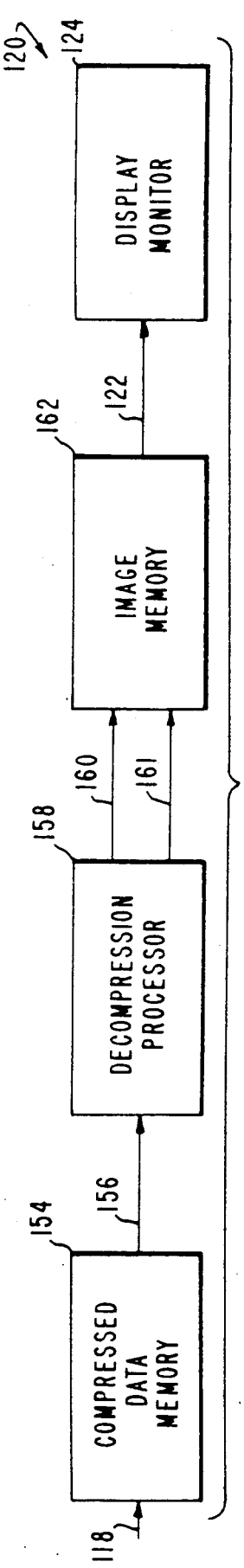
FIG. 1C is a block diagram representation of a data decompression subsystem in accordance with the principles of the present invention.

A decompression subsystem 120 in accordance with the principles of the present invention is shown in FIG. 1C. A compressed data memory 154 is coupled to a decompression processor 158. The decompression processor 158 is coupled to an image memory 162, which in turn is coupled to the display monitor 124 in accordance with the present invention. In the communication system 110 (FIG. 1A), the compressed image 118 received from the communication subsystem 116 is stored as a table of icons and related attributes in the compressed data memory 154 that is included in the data decompression subsystem 120. In a database memory system 130 (FIG. 1B), the compressed image 118 is received from the database memory subsystem 136 is stored as a table of icons and related attributes in the compressed data memory 154. The compressed data memory 154 may be included in the data decompression subsystem 120 and is typically implemented as a buffer memory that stores data compressed image data.

The decompression processor 158 processes a data compressed image signal 156 from the compressed data memory 154 and generates a decompressed image intensity signal 160 to be stored in the image memory 162 under control of two dimensional memory mapped row and column addresses 161. The decompression processor 158 generates two dimensional memory mapped addresses to store the two dimensional image into the image memory 162. The display monitor 124 is refreshed with refresh signal 122 from the image memory 162 to display the decompressed image.

The compressed data memory 154 is sequentially addressed to access the table of data compressed icons and related attributes in sequential tabular form. The image memory 162 is addressed in two dimensional memory map form to access a two dimensional image stored as columns and rows of pixels.

The image memory 162, operating under control of addresses 161 generated by the decompression processor 158, is implemented as a two dimensional memory map for storing a two dimensional image having 1,000 rows by 1,000 columns of pixels (1,000,000 pixels). The image is partitioned into 10,000 blocks of pixels arranged in a two dimensional memory map array of 100 rows by 100 columns of blocks of pixels with each block of pixels having a two dimensional array of 10 rows by 10 columns of pixels. The block partitioning is implicit in the generating of each 10 by 10 array of pixels by the decompression processor 158. This two dimensional pixel and block addressing arrangement is discussed in more detail hereinafter.

The decompression processor 158 advances the block base address on a block-by-block basis (ten pixels at a time) for each row. As each row of blocks is accessed, it advances the block address on a block row by block row basis (ten pixels at a time) to access each row of blocks. For each block of pixels, the decompression processor 158 advances the pixel address in the selected block of pixels on a pixel-by-pixel basis (one pixel at a time) for each row of pixels. As each row is accessed, it advances the pixel address on a pixel row by pixel row basis (one pixel at a time) to access each row of pixels. Accessing of each block of pixels is accomplished by generating the same raster scan sequence of pixel addresses for each block of pixels and by indexing the pixel addresses with the block base address for the particular block of pixels. Because the present invention provides for processing of each block of pixels independent of each other block of pixels, the sequence of generating the blocks of pixels is not critical and parallel processing of independent blocks of pixels is facilitated.

Figure 2:
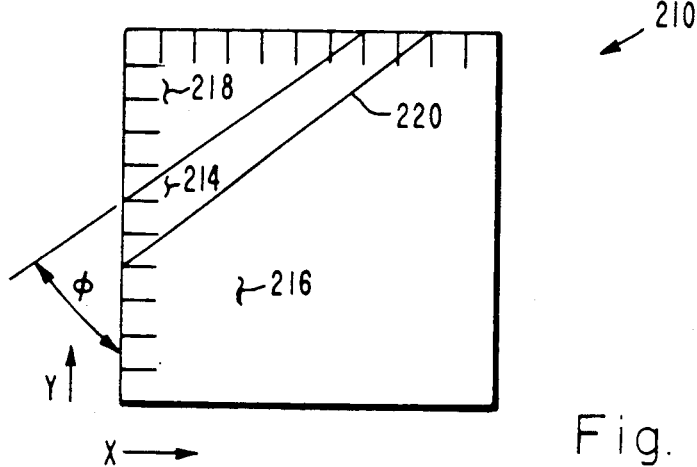
FIG. 2 is a diagram of a block of pixels having a ribbon icon that is decompressed in accordance with the principles of the present invention.

A block of pixels 210 in accordance with the principles of the present invention is shown in FIG. 2. The block contains an array of 10 pixels by 10 pixels. Exterior regions of pixels 216, 218 have an exterior intensity and are separated by a ribbon region 214 having an interior intensity. The principal axis of the ribbon X axis and Y axis is defined by the angle $\phi$. This ribbon icon diagram is discussed in detail hereinafter and is representative of other orthogonal icons discussed hereinafter.

Figure 3A:
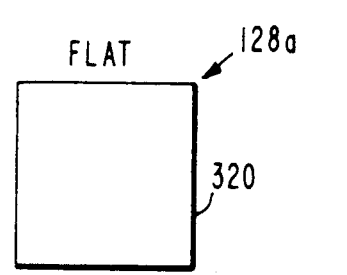
FIGS. 3A-E are a diagrams of symbolic icon types and the related attributes.
Figure 3B:
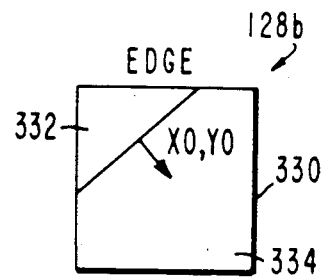
Figure 3C:
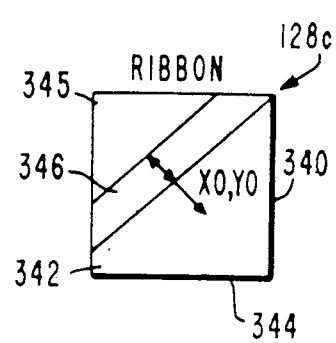
Figure 3D:
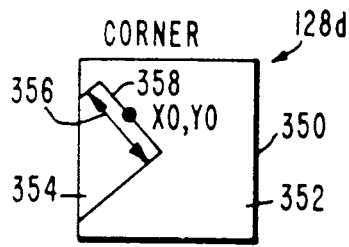
Figure 3E:
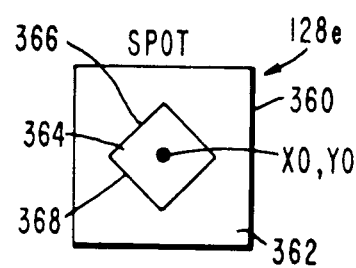

A plurality of orthogonal icons 128 in accordance with the principles of the present invention are shown in FIGS. 3A to 3E. FIG. 3A shows a flat icon 128a, FIG. 3B shows an edge icon 128b, FIG. 3C shows a ribbon icon 128c, FIG. 3D shows a corner icon 128d, and FIG. 3E shows a spot icon 128e. The icons 128 shown with the principal axes at an angle of about 45 degrees to the axis of the block of pixels. The family of icons has been generated by data compression to be consistent with the types of features that they are intended to generate.

The flat 128a (FIG. 3A) represents a block of pixels 320 that has no discernible structure or that is roughly uniform or specular in intensity distribution. The flat icon 128a does not have any edges and hence generates a block of pixels 320 having a constant average exterior intensity.

The edge icon 128b (FIG. 3B) represents a block of pixels 330 whose dominant structure is a single step transition in intensity. The edge icon 128b has a single edge and hence generates a block of pixels 330 having two regions 332, 334 of different intensities. The position of the edge is defined by the coordinates $X_0$, $Y_0$ of the center of the edge. The exterior intensity 332 is defined as being in the opposite direction relative to an arrow pointing from the center of the edge toward the center of the block of pixels. The interior intensity 334 is defined as being in the same direction as an arrow pointing from the center of the edge toward the center of the block of pixels.

The ribbon icon 128c (FIG. 3C) represents a block of pixels 340 whose dominant structure consists of a ribbon having two parallel edges. The ribbon icon 128c has two parallel edges and hence generates a block of pixels 340 having an exterior intensity 344, 345 split by a ribbon of interior intensity 342. The position of the ribbon is defined by the coordinates $X_0$, $Y_0$ of the center of the inside edge of the ribbon. The width of the ribbon is defined as the length of vector 346 that is normal to the two edges and interposed between the two edges.

The corner icon 128d (FIG. 3D) represents a block of pixels 350 whose dominant structure consists of two orthogonally intersecting intensity transitions. The corner icon 128d has a four sided region of edges with one of the edges corresponding with an edge of the block of pixels 350 and hence generates a block of pixels having an exterior intensity 352 and having a corner region of interior intensity 354. The position of the corner is defined by the coordinates $X_0$, $Y_0$ of the center of the inside edge 358 of the corner. The width of the corner is defined as the length of vector 356 that is normal to the two edges and interposed between the two edges.

The spot icon 128e (FIG. 3E) represents a block of pixels 360 whose dominant structure consists of a small area which is significantly different in intensity from the rest of the region. The spot icon 128e has a four sided region of edges and hence generates a block of pixels 360 having an exterior intensity 362 and having a spot region of interior intensity 364. The position of the spot is defined by the coordinates $X_0$, $Y_0$ of the center of the spot. The width of the corner is defined as the magnitude of the edge 366 and the length of the corner is defined as the magnitude of the edge 368.

Figure 4A:
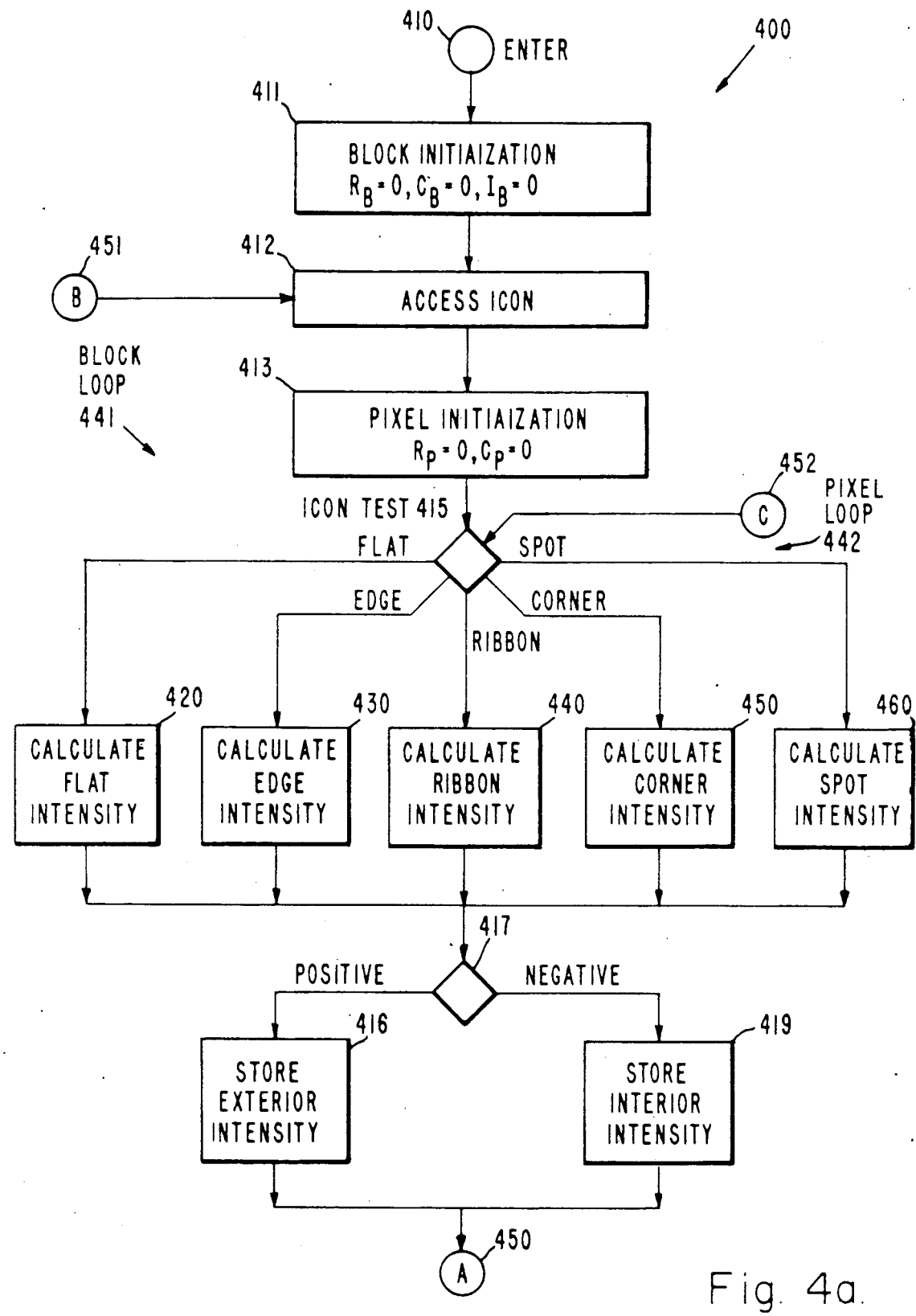
FIGS. 4A and 4B, is a detailed flow diagram of decompression operations.
Figure 4B:
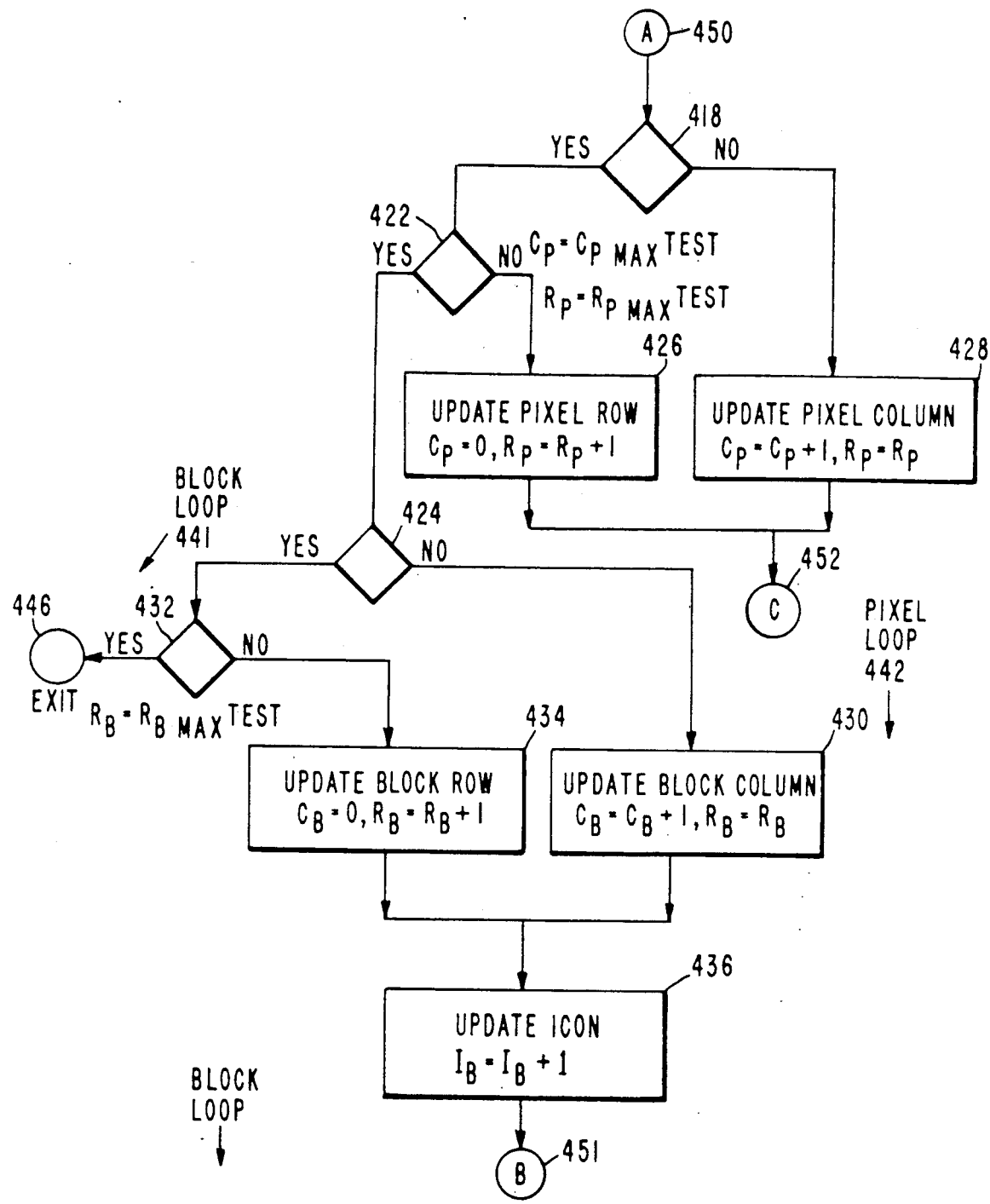

A flow diagram 400 of decompression operations in accordance with the principles of the present invention is shown in FIGS. 4A and 4B. FIGS. 4A and 4B are coupled with coupling symbols A 450, B 451, and C 452. These coupling symbols 450-452 have the same reference numerals in both, FIG. 4A and FIG. 4B.

The flow diagram is implemented in the decompression processor 158 by accessing icon parameters from the compressed data memory 154 and by storing blocks of pixels related thereto into the image memory 162. Each block of pixels is decompressed by accessing an icon and the related attributes from the compressed data memory 154, scanning a block of 100 pixels by 100 pixels into the appropriate block position in the image memory 162 in response to the icon that is related to that block of pixels, and then advancing to the next icon and block of pixels in sequence. The scanning of pixels into a block of pixels in the image memory 162 is performed in raster scan form, column by column and row by row for each of ten columns in a row of pixels and for ten rows of pixels. The sequencing of blocks of pixels into the image memory 162 is performed in raster scan form, column by column and row by row for each of ten columns in a row of blocks and for ten rows of blocks. The accessing of icons and attributes from the compressed data memory 154 is performed in sequence consistent with the block by block operations.

The program enters the decompression program through the ENTER operation 410 (FIG. 4A). The program then proceeds to the BLOCK INITIALIZATION operation 411 to initialize the block related parameters, which includes initializing the row address $R_B$ to the zero row in the image memory 162, initializing the column address $C_B$ to the zero column in the image memory 162, and initializing the icon address $I_B$ to the zero icon address in the compressed data memory 154. The zero row address and the zero column address for the block of pixels in the image memory 162 identifies the corner of the image memory 162 at which the block raster scan begins.

The program then proceeds to the BLOCK LOOP of operations 441 which is executed iteratively, once for each block of pixels within an image. The BLOCK LOOP 441 commences with the ACCESS ICON operation 412 where the icon is accessed from the $I_B$ address in the compressed data memory 154. The program then proceeds to the PIXEL INITIALIZATION operation 413 to initialize the pixel related parameters in the selected block of pixels addressed by the current values of $C_B$ and $R_B$, as initialized in the BLOCK INITIALIZATION operation 411 above and as updated in the UPDATE BLOCK COLUMN operation 430 and in the UPDATE BLOCK ROW operation 434 below. In the PIXEL INITIALIZATION operation 413, the row address $R_P$ is initialized to the zero row in the selected block and the column address $C_P$ is initialized to the zero column in the selected block. The zero row address and the zero column address for the pixel in the selected block identifies the corner of the selected block at which the pixel raster scan begins.

The program then proceeds to the PIXEL LOOP of operations 442 which is executed iteratively, once for each pixel within a block. The PIXEL LOOP 442 commences with the ICON TEST operation 415 which tests the icon accessed in the ACCESS ICON operation 412 and calculates a position parameter associated with the current pixel in one of the CALCULATE operations 420, 430, 440, 450, or 450. The sign of the position parameter is indicative of whether the pixel is an interior pixel, as indicated by a negative sign, or an exterior pixel, as indicated by a positive sign.

Various equations used in the CALCULATE operations 420, 430, 440, 450, 460 are discussed below. In these equations the $F(C_p, R_p)$ term is the sign and magnitude of the pixel position parameter for the current pixel in the block of pixels, the $g(C_p, R_p)$ term and the $h(C_p, R_p)$ term are the signs and magnitudes of intermediate position parameters, the $\phi$ term is the angle of the principal axes, the $C_p$ and $R_p$ terms are the coordinates of the current pixel in the block, the ABS[ ] term means the absolute magnitude of the bracketed term, the Sn[ ] term means the sign of the bracketed term, and the OR term means a logical OR operation.

When a flat icon 128a is detected in the ICON TEST operation 415, the program branches along the FLAT path from the ICON TEST operation 415 to the CALCULATE FLAT INTENSITY operation 420 where the position parameter polarity is set to be positive. This is because all pixel intensities in a flat icon block of pixels have the same intensity, which intensity is stored as an exterior intensity attribute.

When an edge icon 128b is detected in the ICON TEST operation 415, the program branches along the EDGE path from the ICON TEST operation 415 to the CALCULATE EDGE INTENSITY operation 430. Therein, the sign and magnitude of the pixel position parameter are calculated from the equation:

$$F(C_p, R_p) = \cos(\phi)(C_p - X_o) + \sin(\phi)(R_p - Y_o),$$

where the $X_o$ and $Y_o$ terms are the coordinates of the center position of the edge, as shown in FIG. 3B.

When a ribbon icon 128c is detected in the ICON TEST operation 415, the program branches along the RIBBON path from the ICON TEST operation 415 to the CALCULATE RIBBON INTENSITY operation 440. Therein, the sign and magnitude of the pixel position parameter are calculated from the equation:

$$F(C_p, R_p) = ABS[\cos(\phi)(C_p - X_o) - \sin(\phi)(R_p - Y_o)] - \text{Width}/2,$$

where the $X_o$ and $Y_o$ terms are the coordinates of the center position of the ribbon and the Width term is the width of the ribbon 246 in a direction orthogonal to the length of the ribbon, as shown in FIG. 3C.

When a corner icon 128d is detected in the ICON TEST operation 415, the program branches along the CORNER path from the ICON TEST operation 415 to the CALCULATE CORNER INTENSITY operation 450 where the sign and magnitude of the pixel position parameter are calculated from the equations:

$$g(C_p, R_p) = ABS[\cos(\phi)(C_p - X_o) + \sin(\phi)(R_p - Y_o)] - \text{Width}/2,$$

$$h(C_p, R_p) = \cos(\phi)(C_p - X_o) - \sin(\phi)(R_p - Y_o), \text{ and}$$

$$Sn[F(C_p, R_p)] = Sn[g(C_p, R_p)] \text{ OR } Sn[h(C_p, R_p)].$$

The $X_O$ and $Y_O$ terms are the coordinates of the center position of the corner and the Width term is the width of the corner 356, as shown in FIG. 3D. The $Sn[F(C_p, R_p)]$ equation means the sign of the $F(C_p, R_p)$ term is positive (implying an exterior intensity) when either the $g(C_p, R_p)$ term or the $h(C_p, R_p)$ term is positive and the sign of the $F(C_p, R_p)$ term is negative (implying an interior intensity) when both the $g(C_p, R_p)$ term and the $h(C_p, R_p)$ term are negative.

When a spot icon 128e is detected in the ICON TEST operation 415, the program branches along the SPOT path from the ICON TEST operation 415 to the CALCULATE SPOT INTENSITY operation 460 where the sign and magnitude of the pixel position parameter are calculated from the equations:

$$g(C_p, R_p) = ABS[\cos(\phi)(C_p - X_o) + \sin(\phi)(R_p - Y_o)] - \text{Width}/2,$$

$$h(C_p, R_p) = ABS[\cos(\phi)(R_p - Y_o) - \sin(\phi)(C_p - X_o)] - \text{Length}/2, \text{ and}$$

$$Sn[F(C_p, R_p)] = Sn[g(C_p, R_p)] \text{ OR } Sn[h(C_p, R_p)].$$

The $X_o$ and $Y_o$ terms are the coordinates of the center position of the spot, the Width term is the width 366 of the spot in a first principal axis direction, and the Length term is the length 368 of the spot in a second principal axis direction. The $Sn[F(C_p, R_p)]$ equation means the sign of the $F(C_p, R_p)$ term is positive (implying an exterior intensity) when either the $g(C_p, R_p)$ term or the $h(C_p, R_p)$ term is positive and the sign of the $F(C_p, R_p)$ term is negative (implying an interior intensity) when both the $g(C_p, R_p)$ term and the $h(C_p, R_p)$ term are negative.

The program then proceeds from the selected one of the CALCULATE operations 420, 430, 440, 450, 460 to the SIGN TEST operation 417 where the sign of the position parameter is tested. If the sign of the position parameter is positive, then the program proceeds along the POSITIVE path to the STORE EXTERIOR INTENSITY operation 416, where the exterior intensity attribute for the current icon is stored in a pixel location in the image memory 162 addressed by the concatenated total column address $C_t$ and total row address $R_t$ in memory map form. If the sign of the position parameter is negative, then the program proceeds along the NEGATIVE path to the STORE INTERIOR INTENSITY operation 419, where the interior intensity attribute for the current icon is stored in a pixel location in the image memory 162 addressed by the concatenated total column address $C_T$ and total row address $R_T$ in memory map form. The total addresses are calculated from the sum of the block addresses and the pixel addresses from the equations: $C_T = C_B + C_P$, and $R_T = R_B + R_P$.

This arrangement of keeping the pixel addresses and the block addresses separate and then combining them in the STORE EXTERIOR INTENSITY operation 416 and in the STORE INTERIOR INTENSITY operation 419 facilitates the selection of the blocks of pixels in raster scan form and the scanning of pixel intensities into each block of pixels in raster scan form.

The program is coupled from FIG. 4A to FIG. 4B through coupling symbol A 450 (FIG. 4A and FIG. 4B). The program completes the current iteration through the PIXEL LOOP 442. The program proceeds to the $C_P = C_{P\,MAX}$ TEST operation 418 from the STORE EXTERIOR INTENSITY operation 416 or from the STORE INTERIOR INTENSITY operation 419 to test if the scanout of the row of pixels has been completed. If $C_P$ is not equal to $C_{P\,MAX}$, then the scanout of the row of pixels has not yet been completed, where the program proceeds along the NO path from the $C_P = C_{P\,MAX}$ TEST operation 418 to the UPDATE PIXEL COLUMN operation 428. In the UPDATE PIXEL COLUMN operation 428, the $C_P$ address is incremented to the next pixel in the row of pixels and the $R_P$ address is preserved. The program then loops back in the PIXEL LOOP 442 from coupling symbol C 452 (FIG. 4B) to coupling symbol C452 (FIG. 4A) and then to the ICON TEST operation 415 to process the next pixel in the current block of pixels. If $C_P$ is equal to $C_{P\,MAX}$, as determined in the $C_P = C_{P\,MAX}$ TEST operation 418, then the scanout of the row of pixels has been completed, where the program proceeds along the YES path from the $C_P = C_{P\,MAX}$ TEST operation 418 to the $R_P = R_{P\,MAX}$ TEST operation 422 to invoke processing for a new row of pixels.

The program then proceeds to the $R_P = R_{P\,MAX}$ TEST operation 422 from the $C_P = C_{P\,MAX}$ TEST operation 418 to test if the last row of pixels has been completed. If $R_P$ is not equal to $R_{P\,MAX}$, then the row of pixels that has just been completed is not the last row of pixels, where the program proceeds along the NO path from the $R_P = R_{P\,MAX}$ TEST operation 422 to the UPDATE PIXEL ROW operation 426. In the UPDATE PIXEL ROW operation 426, the $R_P$ address is incremented to the next row and the $C_P$ address is set to zero, which is the start of the next row. The program then loops back in the PIXEL LOOP 442 to the ICON TEST operation 415 to process the next pixel in the current block of pixels. If $R_P$ is equal to $R_{P\,MAX}$, as determined in the $R_P = R_{P\,MAX}$ TEST operation 422, then the scanout of the last row of pixels has been completed, where the program proceeds along the YES path from the $R_P = R_{P\,MAX}$ TEST operation 422 to the $C_B = C_{B\,MAX}$ TEST operation 424, exiting the PIXEL LOOP 442 and continuing in the BLOCK LOOP 441.

The program then completes the current iteration through the BLOCK LOOP 441. The program proceeds to the $C_B = C_{B\,MAX}$ TEST operation 424 from the $R_P = R_{P\,MAX}$ TEST operation 422 to test if the processing of the current row of blocks of pixels has been completed. If $C_B$ is not equal to $C_{B\,MAX}$, then the processing of the current row of blocks of pixels has not been completed, where the program proceeds along the NO path from the $C_B = C_{B\,MAX}$ TEST operation 424 to the UPDATE BLOCK COLUMN operation 430. In the UPDATE BLOCK COLUMN operation 430, the $C_B$ address is incremented to the next block in the row of blocks and the $R_B$ address is preserved. The program then loops back in the BLOCK LOOP 441 from coupling symbol B 451 (FIG. 4B) to coupling symbol B 451 (FIG. 4A) and then to the ACCESS ICON operation 412 to process the next block of pixels in the image. If $C_B$ is equal to $C_{B\ MAX}$, as determined in the $C_B=C_{B\ MAX}$ TEST operation 424, then the processing of the current row blocks of pixels has been completed, where the program proceeds along the YES path from the $C_B=C_{B\ MAX}$ TEST operation 424 to the $R_B=R_{B\ MAX}$ TEST operation 432 to invoke processing for a new row of blocks of pixels.

The program then proceeds to the $R_B=R_{B\ MAX}$ TEST operation 432 from the $C_B=C_{B\ MAX}$ TEST operation 424 to test if the last row of blocks of pixels has been completed. If $R_B$ is not equal to $R_{B\ MAX}$, then the row of blocks of pixels that has just been completed is not the last row of blocks of pixels, where the program proceeds along the NO path from the $R_B=R_{B\ MAX}$ TEST operation 424 to the UPDATE BLOCK ROW operation 434. In the UPDATE BLOCK ROW operation 434, the $R_B$ address is incremented to the next row of blocks of pixels and the $C_B$ address is set to zero, which is the start of the next row. The program then loops back in the BLOCK LOOP 441 to the ACCESS ICON operation 412 to process the next block of pixels in the image. If $R_B$ is equal to $R_{B\ MAX}$, as determined in the $R_B=R_{B\ MAX}$ TEST operation 432, then the processing of the last row of blocks of pixels has been completed, where the program proceeds along the YES path from the $R_B=R_{B\ MAX}$ TEST operation 432 to the EXIT operation 446, exiting the BLOCK LOOP 441 and the program routine 400. Many alternative embodiments may be implemented from the teachings herein. For example, the image memory 162 and the compressed data memory 154 may be implemented as different memories and the decompression processor 158 may be partitioned to be in separate processors or in different portions of the same processor. Also, the decompression processor 158 may be implemented in parallel processing form, in pipeline processing form, in parallel pipeline processing form, or in other processing forms. The decompression processor 158 may be implemented for example by a stored program processor or by a special purpose hardwired processor. Stored program processors may be implemented for example by microprocessors, by array processors, or by RISC processors.

Thus there had been described a new and improved image data decompression system and method. It is to be understood that the above-described embodiments are illustrative of some of the many specific embodiments that represent applications of the principles of the present invention. Clearly, numerous and varied other arrangements may be designed by those skilled in the art without departing from the scope of the invention.

It is to be understood that the above-described embodiment is merely illustrative of some of the many specific embodiments which represent applications of the principles of the present invention. Clearly, numerous and other arrangements may be readily devised by those skilled in the art without departing from the scope of the invention.

What is claimed is:

1. A data decompression system for generating and displaying a decompressed image comprising:
   an input memory adapted to store a data compressed image comprising a plurality of icons, each icon having predetermined attributes associated therewith and representative of image content of a block of pixels and including an attribute representative of a principal axis angle of a feature in said block of pixels;
   a decompression processor coupled to the input memory that is adapted to generate a data decompressed image that is a combination of the plurality of icons of the data compressed image;
   said decompression processor including a principal axis processor adapted to generate the data decompressed image as a plurality of decompressed blocks of pixels, each decompressed block of pixels being generated by decompression processing of an icon about said principal axis in response to the principal axis angle; and
   image display means coupled to the decompression processor for displaying the data decompressed image.

2. The data decompression system of claim 1, wherein the decompression processor is adapted to independently process each of the plurality of icons to generate the data decompressed image.

3. The data decompression system of claim 1, wherein the decompression processor includes a pixel block processor adapted to generate the data decompressed image as a plurality of decompressed blocks of pixels, each decompressed block of pixels being generated in response to decompression processing of one of the icons of the data compressed image.

4. The data decompression system of claim 1, wherein the decompression processor includes a pixel block processor adapted to generate the data decompressed image as a plurality of decompressed blocks of pixel features, each decompressed block of pixels being generated in response to decompression processing of one of the icons of the data compressed image, wherein the plurality of icons includes a flat icon, and wherein the pixel block processor includes a flat icon processor adapted to generate at least one of the decompressed blocks of pixels as a flat image feature block of pixels having a uniform intensity in response to the flat icon.

5. The data decompression system of claim 1, wherein the decompression processor includes a pixel block processor adapted to generate the data decompressed image as a plurality of decompressed blocks of pixel features, each decompressed block of pixels being generated in response to decompression processing of one of the icons of the data compressed image, wherein the plurality of icons includes an edge icon, and wherein the pixel block processor includes an edge icon processor adapted to generate at least one of the decompressed blocks of pixels as an edge image feature block of pixels having a single edge separating two intensity regions, each intensity region having an intensity that is different from the intensity of the other intensity region.

6. The data decompression system of claim 1, wherein the decompression processor includes a pixel block processor adapted to generate the data decompressed image as a plurality of decompressed blocks of pixel features, each decompressed block of pixels being generated in response to decompression processing of one of the icons of the data compressed image, wherein the plurality of icons includes a ribbon icon, and wherein the pixel block processor includes a ribbon icon processor adapted to generate at least one of the decompressed blocks of pixels as a ribbon image feature block of pixels having an exterior intensity ribbon and having a ribbon of an interior intensity formed by two edges and traversing a block of pixels.

7. The data decompression system of claim 1, wherein the decompression processor includes a pixel block processor adapted to generate the data decompressed image as a plurality of decompressed blocks of pixel features, each decompressed block of pixels being generated in response to decompression processing of one of the icons of the data compressed image, wherein the plurality of icons includes a corner icon, and wherein the pixel block processor includes a corner icon processor adapted to generate at least one of the decompressed blocks of pixels as a corner image feature block of pixels having an exterior intensity and having a corner with an interior intensity formed by three edges within the block of pixels.

8. The data decompression system of claim 1, wherein the decompression processor includes a pixel block processor adapted to generate the data decompressed image as a plurality of decompressed blocks of pixel features, each decompressed block of pixels being generated in response to decompression processing of one of the icons of the data compressed image, wherein the plurality of icons includes a spot icon, and wherein the pixel block processor includes a spot icon processor adapted to generate at least one of the decompressed blocks of pixels as a spot image feature block of pixels having an exterior intensity and having a spot with an interior intensity formed by four edges within the block of pixels.

9. A database memory system comprising:
   an image input circuit adapted to generate an input image comprising a plurality of pixels;
   a data compression processor coupled to the image input circuit that is adapted to generate a data compressed image comprising a plurality of icons in response to the input image, each icon having predetermined attributes associated therewith and representative of image content of a block of pixels and including an attribute representative of a principal axis angle of a feature in said block of pixels;
   a database memory coupled to the data compression processor and adapted to store the data compressed image comprising the plurality of icons;
   a decompression processor coupled to the database memory and adapted to generate a data decompressed image having a plurality of pixels in response to the data compressed image comprising the plurality of icons;
   said decompression processor including a principal axis processor adapted to generate the data decompressed image as a plurality of decompressed blocks of pixels, each decompressed block of pixels being generated by decompression processing of an icon about said principal axis in response to the principal axis angle; and
   image display means coupled to the decompression processor for displaying the data decompressed image.

10. The database memory system of claim 9, wherein the decompression processor is adapted to independently process each of the plurality of icons to generated the data decompressed image.

11. The database memory system of claim 9, wherein the decompression processor includes a pixel block processor adapted to generate the data decompressed image as a plurality of decompressed blocks of pixels, each decompressed block of pixels being generated in response to decompression processing of an icon.

12. A communication system comprising:
   an image input circuit adapted to generate an input image comprising a plurality of pixels;
   a data compression processor coupled to the image input circuit and adapted to generate a data compressed image comprising a plurality of icons in response to the input image, each icon having predetermined attributes associated therewith and representative of image content of a block of pixels and including an attribute representative of a principal axis angle of a feature in said block of pixels;
   a communication subsystem coupled to the data compression processor and adapted to communicate the data compressed image having the plurality of icons to a remote location;
   a decompression processor located at the remote location, and coupled to the communication system, that is adapted to generate a data decompressed image having a plurality of pixels in response to the data compressed image having the plurality of icons;
   said decompression processor including a principal axis processor adapted to generate the data decompressed image as a plurality of decompressed blocks of pixels, each decompressed block of pixels being generated by decompression processing of aicon about said principal axis in response to the principal axis angle; and
   image display means located at the remote location, and coupled to the decompression processor for displaying the data decompressed image.

13. The communication system of claim 12, wherein the decompression processor is adapted to process each of the plurality of icons independent of the processing of each of the other ones of the icons to generate the data decompressed image.

14. The communication system of claim 12, wherein the decompression processor includes a pixel block processor adapted to generate the data decompressed image as a plurality of decompressed blocks of pixels, each decompressed block of pixels being generated in response to decompression processing of an icon.

15. A method of data decompressing an image, said method comprising the steps of:
   storing a plurality of icons related to a data compressed image in a memory, each icon having predetermined attributes associated therewith and representative of image content of a block of pixels and including an attribute representative of a principal axis angle of a feature in said block of pixels;
   accessing each icon of the plurality of icons stored in the memory;
   generating a decompressed block of pixels in response to each of the plurality of accessed icons; and
   combining the decompressed blocks of pixels to form a decompressed image.

16. The method of of claim 15 which further comprises the step of:
   independently processing each of the plurality of icons to generate the data decompressed image.

17. The method of claim 15 wherein the step of generating a block of pixels further comprises the step of:
   generating the data decompressed image as a plurality of decompressed blocks of pixels, each decompressed block of pixels being generated in response to decompression processing of one of the icons of the data compressed image.

18. The method of claim 15 which further comprises the step of:

generating the data decompressed image as a plurality of decompressed blocks of pixels by decompression processing of an icon about a principal axis in response to the princial axis angle.

19. The method of claim 15 wherein said plurality of icons includes a flat icon; and
said step of generating comprises generating at least one decompressed block of pixels as a flat image feature block of pixels having a uniform intensity in response to the flat icon.

20. The method of claim 15 wherein said plurality of icons includes an edge icon; and
said step of generating comprises generating at least one edge image feature block of pixels having a single edge separating two intensity regions, each intensity region having an intensity that is different from the intensity of the other intensity region.

21. The method of claim 15 wherein said plurality of icons includes a ribbon icon; and
wherein said step of generating comprises generating at least one of the decompressed blocks of pixels as a ribbon image feature block of pixels having an exterior intensity ribbon and having a ribbon of an interior intensity formed by two edges and traversing a block of decompressed pixels.

22. The method of claim 15 wherein the plurality of icons includes a corner icon; and
said step of generating comprises generating at least one decompressed block of pixels as a corner image feature block of pixels having an exterior intensity and having a corner with an interior intensity formed by three edges within the block of pixels.

23. The method of claim 15 wherein the plurality of icons includes a spot icon; and
said step of generating comprises generating at least one decompressed block of pixels as a spot image feature block of pixels having an exterior intensity and having a spot with an interior intensity formed by four edges within the decompressed block of pixels.

* * * * *